United States Statutory Invention Registration [19]

[11] Reg. Number: H433

Butler [43] Published: Feb. 2, 1988

[54] ELECTRONIC WARFARE SOFTWARE SYSTEM DESIGN AN INTEGRATED APPROACH

[75] Inventor: Louis P. Butler, Severn, Md.

[73] Assignee: The United States of America as represented by the Secretary of the Air Force, Washington, D.C.

[21] Appl. No.: 811,901

[22] Filed: Dec. 20, 1985

[51] Int. Cl.[4] ..... G01S 7/38

[52] U.S. Cl. ..... 342/14

[58] Field of Search ..... 342/14, 15

[56] References Cited

U.S. PATENT DOCUMENTS

| | | | |
|---|---|---|---|
| Re. 26,171 | 3/1967 | Falkoff | 364/200 |
| 3,764,999 | 10/1973 | Simons et al. | 340/172.5 |
| 3,896,442 | 7/1975 | Heminway et al. | 343/18 E |
| 4,019,180 | 4/1977 | Graves | 343/6 ND |
| 4,042,927 | 8/1977 | Helms | 343/18 E |
| 4,209,835 | 6/1980 | Guadagnolo | 364/715 |
| 4,586,046 | 4/1986 | Pringle et al. | 342/14 |

*Primary Examiner*—Stephen C. Buczinski
*Assistant Examiner*—Linda J. Wallace

[57] ABSTRACT

An electronic warfare software system design for an electronic counter measures system is presented which includes two general purpose processors (GPP) and multiple special purpose processors (SPP). The GPPs are the system controllers. These GPPs transmit setup data, including time information or hardware item and all related tasks for that function or hardware item. The SPPs are not required to handle multiple tasks and therefore do not require high complexity design. Also the complexity of the GPPs is reduced. The requirements of the system could be met by each SPP, keyed off a central clock strobe, with the resources of the processor dedicated to satisfying that function's time critical needs. In the two GPP setup the GPPs retain central control as well as completing overhead type tasks. There is one central executive control function that allocates tasks to be done to each of the processors. All the SPPs are addressable by either of the GPPs and the GPPs share an instruction and data memory fetch arbitrator.

4 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRONIC WARFARE SOFTWARE SYSTEM DESIGN AN INTEGRATED APPROACH

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to electronic counter measure (ECM) systems which use multi-processors, and more specifically to a multi-processor system design which uses: general purpose processors, as system controllers, and multiple special purpose processors to control peripherals.

The digital avionics system software design of the future will require a more complex functional design while at the same time providing a much more visible, maintainable, and cost effective product. These two requirements are at cross purposes with each other and provide the challenge to the software system designers.

Most military avionics systems of the recent past have dealt with the primary mission problems on a one-to-one basis. The products that resulted were stand alone systems which resulted in a proliferation of support packages and operational languages. This profileration has lead to great customer dissatisfaction and the need for single system "experts" to maintain those products.

Characteristic of the general problem observed is the use of one or more large general purpose processors to handle: system central control; data; directions to major peripherals (receivers, etc.); as well as interpretation of data in real time. While this problem has been directly observed in ECM systems, it may be characteristic of other multi-processor, multi-function complex systems.

The task of providing a multi-processor system capable of maintaining appropriate control of peripherals and effective system control is alleviated, to some degree, by the following U.S. patents; the disclosures of which are specifically incorporated by reference:

U.S. Pat. No. 4,209,835 issued to Guadagnolo on June 24, 1980;

U.S. Pat. No. 4,019,180 issued to H. Graves on Apr. 19, 1977;

U.S. Pat. No. 3,896,422 issued to Heminway et al on July 22, 1975; and

U.S. Pat. No. 4,042,927 issued to Helms on Aug. 16, 1977.

The Guadagnolo reference discloses a PRI (pulse repetition interval) autocorrelation system responsive to pulse time of arrival data received from a plurality of emitters. This system includes a central processor and multiple special purpose processors.

The Graves reference discloses a remote infrared signal communicator having a radio link to a remote monitoring station and includes a code modulation processor, a display signal processor, and a video modulation processor. The surveillance system of Graves is an example of a peripheral which is controlled by its own display signal processor.

Helms discloses a monopulse radar to track jammers. The Helms system includes multiple special purpose computers.

Heminway et al disclose a correlator system for receiving inputs from jamming targets and missiles which includes multiple processors. This is an electronic counter counter measure (ECCM) system with a general purpose processor directing the special purpose correlator processor.

From the foregoing discussion, it is apparent that there currently exists the need for a multi-processor ECM system which uses general purpose processors for system control, and multiple special purpose processors to control the peripherals. The present invention is intended to satisfy that need.

SUMMARY OF THE INVENTION

The present invention is a multi-processor system design which includes a processor set that utilizes special purpose processors to handle the major peripherals (receivers for example) and general purpose processors for system central control as well as interpretation of dynamic data.

The previous electronic counter measure system allocated all tasks to one or more general purpose processors, including the control of peripherals since peripheral hardware had no processing capability. It was noted that the use of general purpose processors for both time critical special purposes (waveform generation, real-time data interpretation) as well as general purposes, such as system control, degraded the efficiency of processors to complete any task. The reason for this is that time critical tasks would require time interval interrupts which shift the paths of execution to higher priority tasks, while "putting off" lower priority tasks.

To resolve the above, both general purpose processors as well as special purpose processors should be used. In the present invention, general purpose processors serve as system controllers. They transmit commands to a series of special purpose processors which directly control hardware items. The result is a system which provides parallel processing which takes advantage of idle times and provides real time service on all tasks.

It is an object of the present invention to provide a multi-processor ECM system which uses at least one general purpose processor for system control, and one or more special purpose processors for controlling all peripherals.

It is another object of the present invention to provide a multi-processor system which inherently provides parallel processing which takes advantage of idle time and potentially allows for real-time processing on all tasks.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is an improved multi-processor system design. The reader's attention is now directed towards FIG. 1 which is a block diagram of a previous multi-processor ECM control system. The ECM system of FIG. 1 is a jamming system which uses two primary general purpose processors (GPP) 101 and 102 to handle all tasks.

Figure 1:
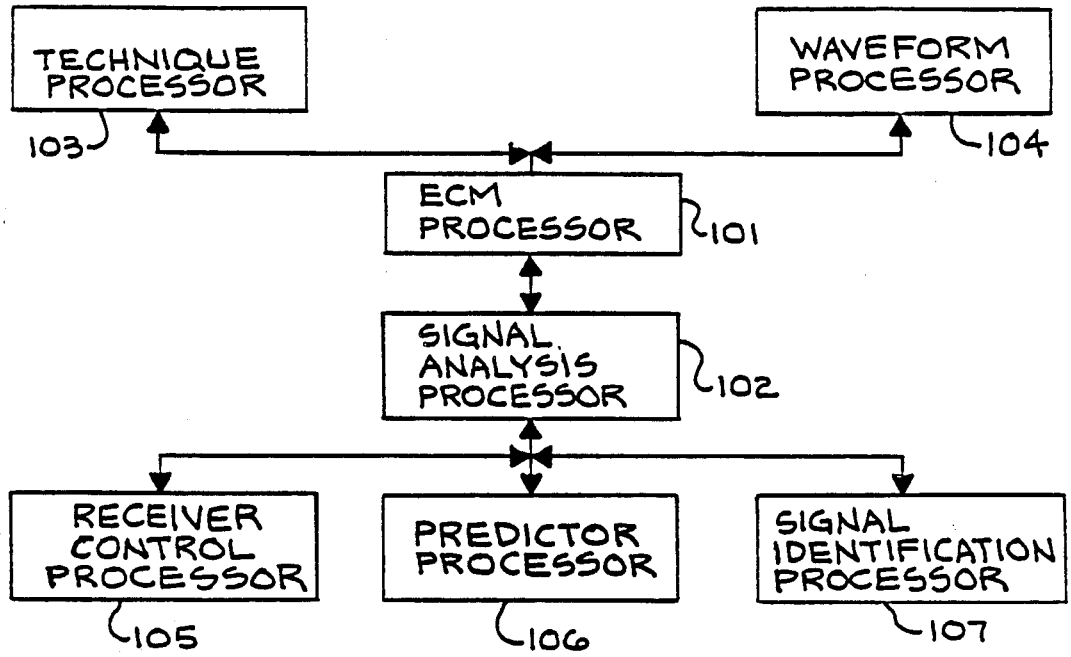
FIG. 1 PRIOR ART
FIG. 1 is a block diagram of the hardware and software blocks of a prior art electronic counter measure control system.

The first general processor of FIG. 1 is the electronic counter measure processor 101. This processor's software is utilized to complete jamming functions including technique set-up support, operator interface, prioritization, and system reaction. These functions are depicted as separate software blocks 103 and 104, which are accomplished by the ECM processor 101.

Figure 2:
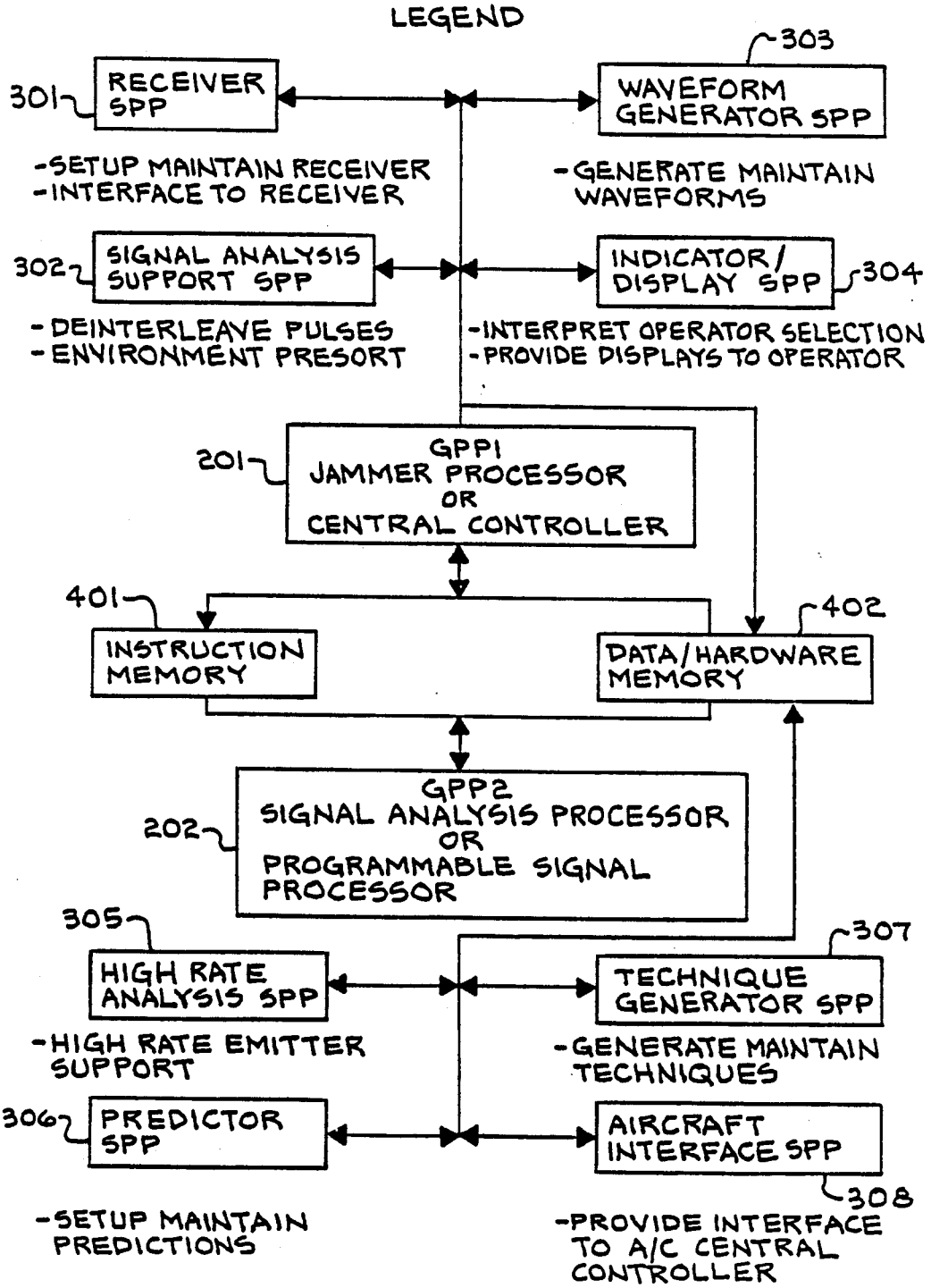
FIG. 2 is a block diagram of an embodiment of the present invention.

As in the system of FIG. 2, the FIG. 1 system controls an electronic counter measure system which includes a receiver for receiving detected signals, and a display. The electronic counter measure (ECM) processor 101 differs from the central controller 201 of FIG. 2 in that the ECM processor 101 directly generates the waveforms for the transmitter, and directly selects a jamming strategy, while the central controller 201 relies on special purpose processors 303 and 307 to perform these functions at its direction in the manner described below.

The second GPP is the signal analysis processor 102. The second GPP's software is utilized to complete signal analysis processing including receiver setups, environmental data interpretation, jamming support, and threat reporting. These functions are depicted as three separate software blocks 105–107, and are accomplished by the signal analysis processor 102.

The signal analysis process 102 of FIG. 1 directly controls the receiver, and directly performs signal identification including the frequency and duration of radar pulses received by the receiver. Once the nature of the tracking radar signals is determined, the signal analysis processor next predicts the nature of the target echo return signal that the aircraft silhouette will generate, in the manner that the predictor SPP 306 of FIG. 2 functions and as discussed below.

The two GPPs of FIG. 1 are required to handle all tasks processing in real time since the hardware has no processing capability and must be directed in all tasks. Further the number and complexity of these tasks are growing and as a direct result the processor throughput requirements and software are forcing an increased complexity upon the design. The new design must contain the capability that will meet or exceed the projected needs, and represent a new approach to the system software.

The first area of design change in the present invention occurs in the utilization and incorporation of special purpose processors. Experience has shown the general purpose processors are effective data handlers, central system controllers and bookkeepers. These tasks are low-rate and mostly non-time critical items. For the tasks that are time critical, such as waveform generation, and jamming technique maintenance, general purpose processors usually require time interval interrupts. These interrupts shift the path of execution to a higher priority task thereby "putting off" the completion of lower priority tasks. The result of the use of the general purpose processors for both general purpose and time critical special purpose tasks is usually the degradation of the efficiency of these processors in completing any task.

In order to meet the needs of a next generation avionics software system design the processor set should include both general purpose processors (GPP) and special purpose processors (SPP). The GPPs would be the system controller(s). These processors transmit setup data, including time information and command data, to a series of SPPs that handle a function or hardware item and all related tasks for the function or hardware item. The additional processors would not be required to handle multiple tasks and therefore would not require high complexity design. Alsc the complexity of the GPPs could be reduced. The requirements of the system could be met by each SPP, keyed off a central clock strobe, with the resources of that processor dedicated to satisfying that function's time critical needs.

In a multiple GPP setup the GPPs retain central control as well as completing overhead type tasks. There is one central executive control function that allocates tasks to be done to each of the processors. All the SPPs are addressable by either of the GPPs and the GPPs share an instruction and data memory fetch arbitrator. In this manner the power of single or multiple GPPs can be brought to bear to fulfill a need of the system. The use of multiple GPPs allows a very clear parallel processing capability and results in a complexity reduction by "slaving" the SPPs to the GPPs operation. Selection of single or multiple GPPs will depend on the customer's reliability and maintainability requirements as well as system processing needs but the combination of GPPs and SPPs in the processor set will be an effective setup for the next generation system.

FIG. 2 shows the solution proposed by this invention with a combined, simplified software and processor hardware block diagram. This figure contains a possible design solution to a next decade system and system software requirement. Each of the processors (GPPs and SPPs) have their respective functions and tasks listed. Details of communications and interface depend on the system targeted but this figure can become a template for the design.

In FIG. 2, the multi-processor design of the present invention is applied to an electronic counter measure system. Exemplary of prior art ECM systems are the jamming systems disclosed in the following U.S. patents, which are specifically incorporated by reference:

U.S. Pat. No. 3,754,256 issued to W. Nystrom;
U.S. Pat. No. 3,699,575 issued to Peters, Jr. et al;
U.S. Pat. No. 3,720,952 issued to Lawsine; and
U.S. Pat. No 3,774,208 issued to Dorn et al.

The system of FIG. 2 has two general purpose processors 201 and 202. The first general purpose processor 201 acts as a central controller to direct the jamming operations by sending commands to addressable special purpose processors 301–304, each of which directly controls the jamming hardware related to its specific function. Such jamming hardware and the individual special purpose processors are both separately known in the art and need not be described further.

The second general purpose processor 202 shares two memories 401 and 402 with the first general purpose processor, and is used for signal analysis of signals detected by the receiver attached to SPP 301. The specific peripherals driven in the ECM system of FIG. 2 include: a jamming signal transmitter driven by the waveform generator SPP 303; a receiver connected with the receiver SPP 301; and a display connected to the display SPP 304. The ECM system of FIG. 2 is a jamming system designed to be housed in an aircraft and SPP 308 is connected to the aircraft interface system. These individual hardware components are known in the art and are discussed individually below.

In the system of FIG. 2, the multiple special purpose processors are used to control peripherals of an electronic counter measure system which includes a receiver for receiving detected signals, a transmitter for transmitting jamming signals, and a display. These special purpose processors operate in parallel to generate waveforms for the transmitter and direct transmission of specific jamming signals, and also control the receiver so that it can continue to receive the detected signals.

The receiver SPP 301 receives and relays detected signals from the receiver to the memory 402 and the first general purpose processor 201, the receiver special purpose processor 301 also receives a receiver control signal from the general purpose processor 201 which it uses to control the receiver so that it continues to receive the detected signals in a parallel operation with the other special purpose processors and the general purpose processor 201. Examples of special purpose processors which control radar receivers are found in the Helms reference, and the Heminway et al. reference. Helms discloses the use of two special purpose digital computers, which receive continuous azimuth and elevation information from a single radar receiver. Heminway et al. disclose the use of a single correlator processor which receives detected signals from two radar receivers.

The waveform generator special purpose processor 303 receives identification signals and transmitted control signals from the first general purpose processor 201 and generates waveforms for the transmitter in response thereto. The waveforms generator special purpose processor 303 thereby controls the radar transmitter in parallel with operation of other special purpose processors and operation of the general purpose processor 201. Examples of special purpose processors which similarly control radar transmitters are found in the above-cited Graves reference.

The indicator/display special purpose processor 304 receives data stored in the memory 402 and directs the display to present said data to users of said electronic counter measure system. Examples of such display special purpose processors in similar usage are found in FIG. 1 of the above-cited Graves reference.

The aircraft interface special support processor 308 is an example of a processor which is needed for airborne radar systems. As indicated in FIG. 2, it provides an interface with the aircraft central controller. Such an interface is commonly used to provide latitude and longitude information from the aircraft inertial navigation system to the radar memory 402 so the radar "knows where it is". Such an interface serves to provide a frame of reference for the radar.

The technique generator SPP 307, as indicated in FIG. 2, generates and maintains the technique or strategy of radar jamming signals used by the electronic counter measure system. This is an optional portion of the system, and reflects the increasing sophistication of electronic counter measure systems as follows. Early radar jamming systems where little more than electromagnetic noise makers which, hopefully, obscured the target echo return signals of radar tracking systems. Noise makers can be filtered out. Therefore modern radar jamming systems include spoofing and mimicking systems that imitate the radar signals that they jam. An excellent example of such a system is contained in U.S. Pat. No. 4,586,046 by R. Pringle et al., which discloses the transmission of a program of false targets. In a similar approach, the technique generator SPP 307 directs the waveform generator SPP 303 to generate waveforms with similar frequencies of the radar signals being jammed.

The predictor SPP 306 is also an optional component of the radar jamming system of FIG. 2. If the system of FIG. 2 is attempting to spoof the signals it jams, then it needs to emit signals which approximate the frequencies of the tracking signals encountered. This approximation may include variations in frequency for a doppler shift, caused by the motion of the aircraft. The predictor SPP receives the frequency and bearing of the radar tracking signals from the receiver SPP 301 via the memory 402, and the aircraft motion from the aircraft interface SPP. The predictor SPP 306 can predict the target echo return that the aircraft will generate in the presence of the tracking signals, and provide such a prediction to the technique generator SPP 307. If the object of the jamming strategy is to null the tracking signals, the technique generator can so direct the waveform generator SPP 303. If the object of the jamming system is to provide false targets, as in the above-cited Pringle et al. reference, the technique generator has sufficient information as to what target echo return signals are actually being generated by the aircraft.

The high rate analysis SPP 305 is also an optional component of the radar jamming system of FIG. 2, and is used when the jamming system wants to produce false targets, as in the above-cited Pringle reference. As mentioned above, the predictor SPP 306 predicts the target echo return that the aircraft silhouette will produce in the presence of the radar tracking signals received by the receiver SPP 301. The technique generator SPP 307 determines the jamming strategy, which may include nulling or mimicking the radar signals. The analysis SPP 305, given the actual radar echo returns produced by the aircraft, and the direction to mimic these signals, produces control signals for the waveform generator SPP 303 in a manner similar to that of the Pringle et al. reference. The result is a bewildering series of false targets received by the radar tracking system.

In operation, the electronic counter system of FIG. 2 could perform as follows. Operations are controlled by the first general purpose processor 201 which receives detected signals which are relayed to it and the memory 402 by the receiver special purpose processor 301. From the characteristics of the detected signals, the first general purpose processor 201 selects appropriate jamming waveforms and transmits waveform identifier signals and control signals to the waveform generator 303.

The waveform generator generates the characteristics of the jamming signal and relays the generated waveform and control signals to the transmitter. The control signals include the azimuth and elevation of the transmitter which is consonant with the origin of the detected signals.

In a similar manner, the receiver SPP 301 receives receiver control signals from the general purpose processor. These receiver control signals may include azimuth and elevation directions as well as a timing signal to shut off the receiver so that it avoids detecting the comparatively strong jamming signals.

The second general purpose processor 202 acts to perform signal analysis on detected signals, which it receives from the memory 402. Signal analysis for jamming purposes is known in the art, and commonly includes: an identification of the frequency, azimuth of origin, elevation of origin and other pertinent characteristics of the detected signals. These characteristics are identified by the second general purpose processor and returned to the memory where they may be extracted by the first general purpose processor, so that it may identify an appropriate waveform to jam the detected signals.

The operation described above is considered novel with respect to the allocation of separate functions to the separate general purpose processors and special purpose processors. This allocation allows parallel processing by all the separate processors rather than simply increasing the size of a central processing unit. This parallel processing approach takes advantage of idle time and provides real-time service on all tasks.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A multi-processor control system for controlling an electronic counter measure system which includes a receiver for receiving detected signals, a transmitter for transmitting jamming signals, and a display, said multi-processor control system comprising:

a plurality of special purpose processors which operate in parallel to generate waveforms for the transmitter and direct transmission of specific jamming signals, said plurality of special purpose processors also controlling the receiver so that it can continue to receive the detected signals;

a first general purpose processor which centrally controls the electronic counter measure system by receiving said detected signals, which are relayed to it by one of the special purpose processors, said first general purpose processor determining an identification of an appropriate jamming waveform and sending identification signals and transmitter control signals to another of the special purpose processors to direct transmission of an appropriate jamming signal, said first general purpose processor performing parallel processing with said plurality of special purpose processors which effectively uses idle time and allows time sensitive tasks to be performed in real time; and a memory means which receives and stores all signals coming to and from said first general purpose processor.

2. A multi-processor control system, as defined in claim 1, wherein said plurality of special purpose processors includes:

a first special purpose processor which receives said identification signals and transmitted control signals from said first general purpose processor and generating waveforms for the transmitter in response thereto, said first special purpose processor controlling the transmitter in parallel with operation of other special purpose processors and operation of the first general purpose processor;

a second special purpose processor which receives and relays detected signals from the receiver to the memory means and the first general purpose processor, said second special purpose processor also receiving a receiver control signal from the first general purpose processor which it uses to control the receiver so that it continues to receive the detected signals in a parallel operation with the other special purpose processors and the general purpose processor; and a third special purpose processor which receives data stored in said memory means and directs said display to present said data to users of said electronic counter measure system.

3. A multi-processor control system, as defined in claim 2, including a second general purpose processor which receives and performs signal analysis on said detected signals from said memory means, said second general purpose processor extracting and identifying therefrom characteristics of the detected signals which may be used by the first general purpose processor returning said signal characteristics to said memory means where they are accessable by said first general purpose processor, said second general purpose processor operating in parallel with said plurality of special purpose processors and said first general purpose processor to maximize use of idle time and to help ensure real-time performance of said electronic counter measure system in response to said detected signals.

4. A multi-processor control system for controlling an electronics counter measure system having a receiver which receives detected signals and a transmitter which transmits jamming signals to counter said detected signals, said multi-processor control system comprising:

a plurality of special purpose processors including a first special purpose processor which acts as a waveform generator processor which is connected to said transmitter and directs said transmitter to transmit said jamming signals;

a first general purpose processor which controls said electronics counter measure system by sending transmit control signals to said first special purpose processor, said control signals including azimuth and elevation directions and an identification of types of waveforms to be generated, said first general purpose processor sending receiver control signals to control the receiver;

a second special purpose processor which receives said receiver control signals from said first general purpose processor and controls said receiver in response thereto, said second special purpose processor relaying said detected signals to said first general purpose processor;

a memory means which receives and stores all signals coming to and from said first general purpose processor; and a second general purpose processor which receives said detected signals from said memory means and performs signal analysis to identify their characteristics, said second general purpose processor then outputting those characteristics to the memory means to enable the first general purpose processor to select effective jamming waveforms.

* * * * *